Sept. 21, 1971     SOFRONIO M. SIAN     3,606,918

PORTABLE CONE TYPE RICE MILL

Filed March 13, 1969     3 Sheets-Sheet 1

SOFRONIO M. SIAN
INVENTOR

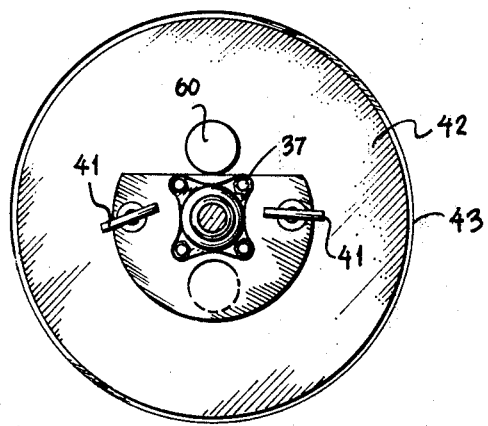
FIG. 4.
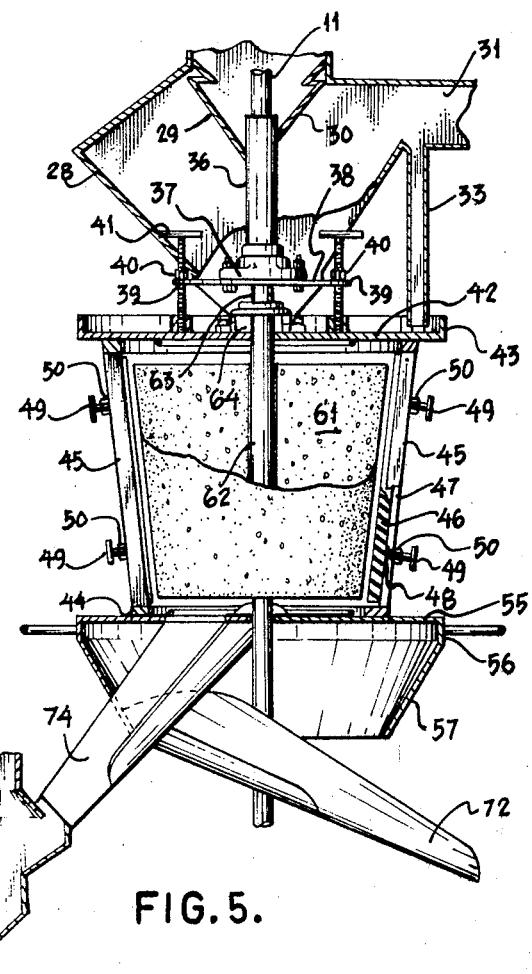
FIG. 5.
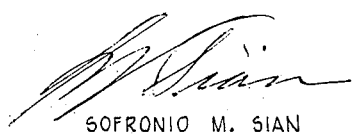
SOFRONIO M. SIAN
INVENTOR

Sept. 21, 1971 SOFRONIO M. SIAN 3,606,918
PORTABLE CONE TYPE RICE MILL
Filed March 13, 1969 3 Sheets-Sheet 3
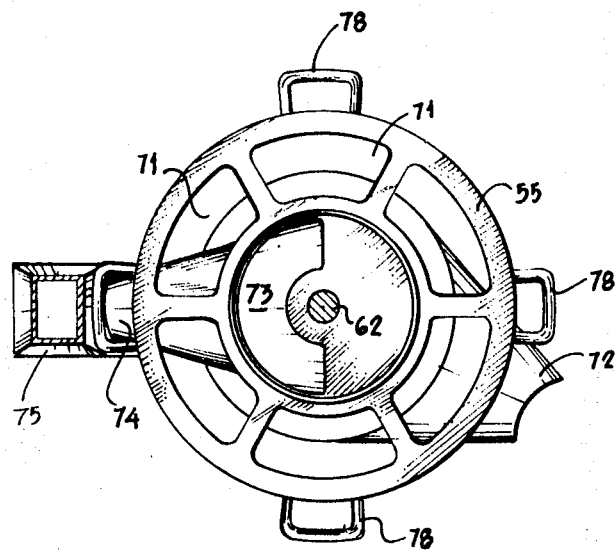
FIG.6.
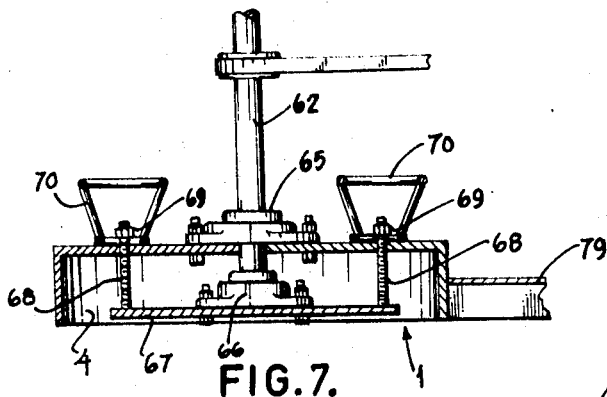
FIG.7.
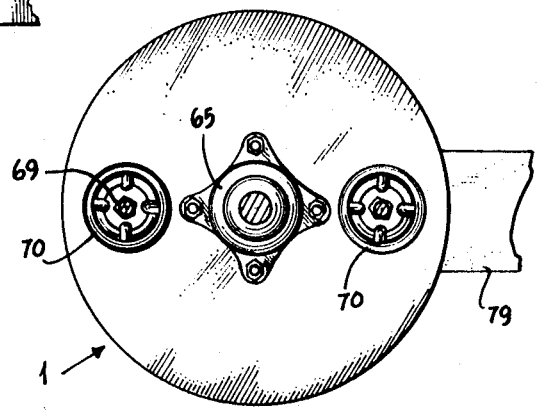
FIG.8.
SOFRONIO M. SIAN
INVENTOR United States Patent Office 3,606,918
Patented Sept. 21, 1971

3,606,918
PORTABLE CONE TYPE RICE MILL
Sofronio M. Sian, 958 J. Rizal Ave., Makati,
Rizal D–711, Philippines
Filed Mar. 13, 1969, Ser. No. 806,993
Int. Cl. B02b *3/00*
U.S. Cl. 146—266                1 Claim

ABSTRACT OF THE DISCLOSURE

The portable cone-type rice mill embodied in this invention consists of an upstanding frame on which are arranged in a super-imposed manner starting from the top, a hopper, a huller, a conical grain polisher and a bran chute. Between the huller and the grain polisher is a husk aspirator connected to a suction blower to suck away the husk from the grain falling from the huller, through the aspirator down to the polisher. Connected to the bottom of the polisher is a grain chute at the end of which is connected a conduit communicating with a second suction blower. The second suction blower is adapted to suck the bran from the polished grain falling from the grain chute. A suitable drive means mounted on said frame is in turn connected to the common shaft of the blowers which shaft is in turn connected to the shafts of the polisher and huller which are joined by a movable coupling.

---

This invention relates to a grain processing machine and more particularly to a portable cone-type rice mill.

Heretofore, rice mills are large and stationary, requiring large floor area and big buildings as housing thereof.

It is also well known that present rice mills have high capacities so that in order to assure the continuous operations thereof, large quantities of grain have to be stocked close to said rice mills. In view of this, complementary warehouses have to be built close to the mills.

Present rice mills are also known to be made up of several complicated mechanical combinations, which combinations in turn are made up of numerous and heavy moving parts. Because of this, the operation and maintenance of present rice mills are rather difficult and expensive.

It is therefore the object of this invention to provide a portable rice mill which is compact, light and easily transportable.

A further object of this invention is to provide a rice mill with a very low first cost and which does not require a permanent and expensive shelter to house it.

Another object of this invention is to provide a portable cone-type rice mill which has very few and simple parts which could process rice as efficiently as the large plant-size rice mills.

It is also an object of this invention to provide a small and compact portable cone-type rice mill which has a high grain recovery and a low grain breakage.

Still another object of this invention is to provide a rice mill which is very simple and so could be easily and cheaply operated and maintained.

A further object of this invention is to furnish a portable rice mill which has a very low power requirement.

These and other objects will be readily comprehended from the following detailed description of the accompanying drawings forming part of this specification, wherein:

FIG. 4 is a top view of the cone or polisher portion thereof;

FIG. 5 is a fragmentary view of the lower portion of this invention of a portable cone-type rice mill showing, the husk aspirator, the cone or polisher portion, the polished rice chute and the rice-bran funnel and spout, said parts partially in section;

FIG. 6 is a top view of the cone or polisher bottom;

FIG. 7 is a fragmentary view showing the base of this portable cone-type rice mill in section;

FIG. 8 is a top view of the base of this portable cone-type rice mill as shown in FIG. 7.

Figure 1:
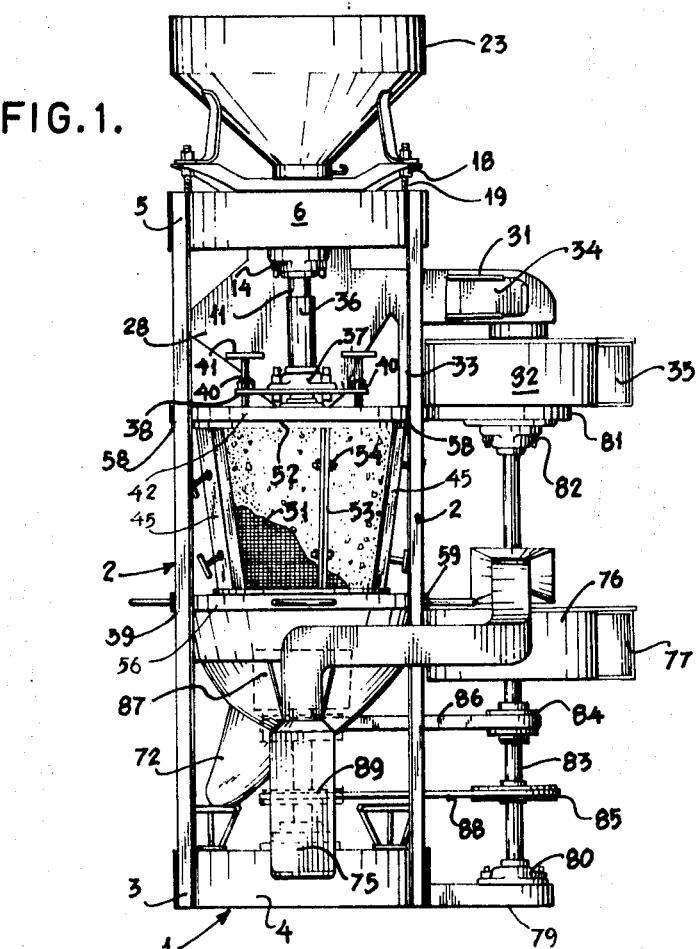
FIG. 1 is an elevational view of the portable cone-type rice mill as embodied in this invention.

Referring now to the drawings, particularly FIG. 1 thereof, the portable cone-type rice mill as embodied in this invention includes an upstanding frame comprising an inverted hollow cylindrical base 1 and three equally spaced apart vertical posts 2, the lower ends 3 of which are welded to the circumferential wall 4 of the base.

Figure 2:
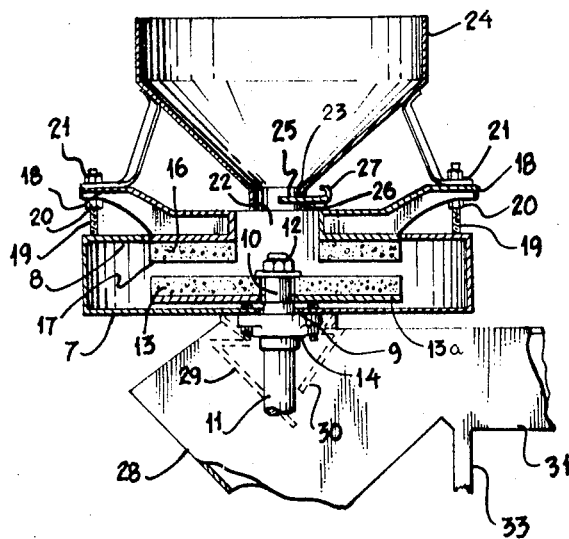
FIG. 2 is a fragmentary view of the upper part of this portable cone-type rice mill showing the funnel and huller portions thereof in section.
Figure 3:
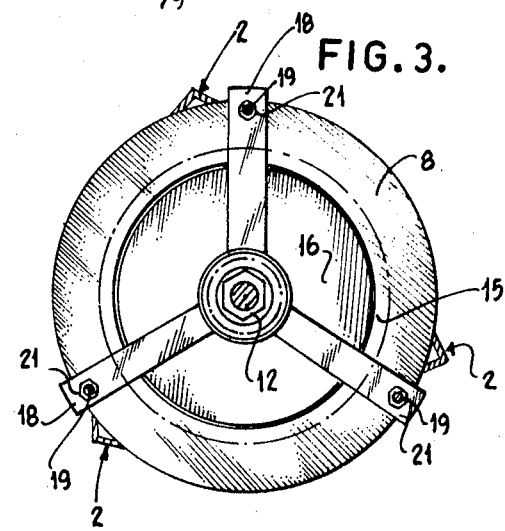
FIG. 3 is a top view of the huller portion of this invention of a portable cone-type rice mill.

At the upper ends 5 of the posts 2 is the huller casing which, as shown in FIGS. 2 and 3, includes a cylindrical shell 6 which is welded to the upper ends of the posts 2, a bottom wall 7 and an inwardly extending flange 8.

The bottom wall of the huller casing has an opening 9 through which the upper end 10 of the shaft 11 protrudes. At the reduced end of said shaft is secured by the nut 12 the huller's lower stone 13 and the base plate 13a thereof. Shaft 11 is rotatably mounted on the flange bearing 14 bolted to the lower side of the bottom wall of the huller casing.

Fitted into the circular opening defined by the inner circumferential rim 15 of the flange 8 is the toroidal plate 16 to which the huller's upper stone 17, which is also, toroidal in shape, is secured.

The plate 16 has three outwardly extending arms 18 each of which is secured to a corresponding bolt 19 by the nuts 20 and 21. The lower ends of the bolts 19 are welded to the flange 8.

At the center of the plate 16 and the huller's upper stone 17 is an opening 22 which communicates with the bottom 23 of the funnel 24 secured to the arms 18. Through an opening 25 on the neck 26 of the funnel 24 is a gate 27 which could be adjusted to control the volume of flow of the grain from the funnel to the huller.

At the bottom wall 7 of the huller casing is an opening (not shown) leading to the husk aspirator 28 consisting of a closed conduit shaped as shown and having at the upper section thereof, baffles 29 and 30. The husk aspirator has a horizontal portion 31 communicating with the blower 32 of conventional design. In the horizontal portion 31 is a by pass 33 and an adjustable window 34. Exit of grain through the by-pass 33 indicates excessive blower effect which could be remedied by simply adjusting the opening of the window 34. The husk sucked by the blower is exhausted through the spout 35. Clean grain in the husk aspirator falls to the grain polisher which will be discussed later.

The lower end of the shaft 11 is splined and is connected to a conventional shaft coupling 36 which is rotatably mounted on the flange bearing 37 secured to the plate 38. Plate 38 has a pair of opopsed holes 39 (see FIG. 5). Welded on the plate 38 and coincident with each of the holes 39 are the nuts 40. Through the nuts 40 are screwed the hand bolts 41, the bottom ends of which rest on the top plate 42 of the polisher casing.

The polisher casing includes the plate 42, a top ring 43 welded to the plate 42, a bottom ring 44, and three (only two shown) equally-spaced apart radially disposed identical brackets 45 each of which houses the rubber polisher 46. At the outer side 47 (side away from the polisher-stone) of each of the rubber polishers are secured the anchor pieces 48 wherein the flared ends of the hand bolts 49 are screwably secured through the nuts 50 welded to the brackets 45 which are inclined outwardly towards the upper ends thereof. The upper ends of the brackets 45 are secured to top ring 43 while the bottom ends thereof are secured to ring 44.

Between the brackets 45 are arcuate wall sections 51 of fine steel wire screen. The frames 52 of said wall section 51 are secured to the brackets 45 while the adjacent sides 53 of said frames are bolted together at 54 as shown in FIG. 1.

The bottom ring 44 of the polisher casing is welded to the upper side of lower plate 55 of the bran funnel which includes a circular wall 56 and an inverted frusto-conical wall 57. As shown in FIG. 1 the upwardly extending rim portion of the top plate 42 is welded at 58 to the posts 2, while the circular wall 56 of the bran funnel is welded at 59 to the posts 2.

At the top plate 42 of the polisher casing is an opening 60 (FIG. 4) to which the bottom of the husk aspirator communicates. Through the opening 60 pass from the husk aspirator and into the top of the inverted frusto-conical shaped polisher stone 61 the de-husked grain. Rotation of the polisher stone 61 throws the de-husked grain to the frusto-conical sides of the polisher stone where due to the combined action of the polisher stone, rubber polisher and the wire screen walls, the de-husked grains are polished. Rubbing of the grains against each other contributes also to the polishing imparting a pearly sheen to the grain particles.

As shown clearly in FIG. 5 the polisher stone is rigidly secured to a shaft 62 which is supported at the upper part 63 thereof by the bearing 64 secured to the plate 42. The lower portion of shaft 62 is rotatably supported by the bearings 65 and 66 (FIGS. 7 and 8). Bearing 65 is secured to the top of the base 1 while bearing 66 is bolted to a plate 67. To the plate 67 are welded two bolts 68 which are diametrically opposed. Bolts 68 extend above the base 1 and to said bolts are screwably attached the nuts 69 of the handwheeels 70. Manipulation of the handwheels will effect raising or lowering of the shaft 62 and the polisher stone 61. The upper end of the shaft 62 is also splined and is connected to the shaft coupling 36 (FIG. 5).

Referring to FIG. 6, the bran funnel top plate 55 has several slots 71 through which the bran passing through the wire screen walls 51 falls down to the bran chute 72.

At the central part of the top plate 55 of the bran funnel as shown clearly in FIG. 6 is an opening 73 through which the polished rice from the polisher falls to the grain chute 74. At the end of the chute 74 is the conduit 75 which communicates with the second blower 76. Bran and other light particles clinging to the polished rice particles are sucked by the blower 76 and blown out through the exhaust spout 77 thereof.

As shown in FIG. 6, the bran funnel is provided with handles 78 for hand-carrying the portable cone-type rice mill.

Going back to FIG. 1, the base 1 has an extension 79 to which bearing 80 is secured. Horizontally in line with the polisher top plate is an extension 81 which is vertically in line with extension 79. Secured to the extension 81 is a bearing 82. Bearings 80 and 82 support rotatably the lower and upper ends, respectively, of the common shaft 83 of the blowers. On the shaft 83 are secured the pulleys 84 and 85. Pulley 84 is connected by the endless belt 86 to the drive shaft of a suitable prime mover 87 (indicated in dotted lines) mounted on a suitable support secured to the posts 2.

Pulley 85 is connected by the endless belt 88 to the pulley 89 (FIG. 5) secured to the shaft 62 of the polisher stone.

Various modifications may be made on the embodiment of the portable cone-type rice mill described above without departing from the essense of the invention as defined in the appended claim.

I claim:

1. A portable cone-type rice mill comprising an upstanding frame; a funnel at the top of said frame; a huller directly below said funnel and communicating therewith; a polisher directly below said huller, said polisher directly below said huller, said polisher including a rotating inverted frusto-conical stone member, several rubber strips positioned radially in equal spaced relation around said frusto-conical stone member and in close proximity thereto, and arcuate wire screen positioned between said rubber strips; a husk aspirator communicating at the upper portion thereof with said huller and the lower portion thereof with said polisher, a first blower communicating with said husk aspirator, a bran funnel below said huller and communicating with said huller, a second blower communicating with said grain chute at the lower end thereof, and drive means for driving said first and second blowers, said huller and said inverted frusto-conical stone member of said polisher.

References Cited

UNITED STATES PATENTS 778,193 12/1904 Hartmann ---------- 146—266
2,365,179 12/1944 Egedal ------------ 146—288X WILLIE G. ABERCROMBIE, Primary Examiner U.S. Cl. X.R.

146—281, 288, 296; 241—76, 257